US006627144B1

(12) United States Patent
Suda et al.

(10) Patent No.: US 6,627,144 B1
(45) Date of Patent: Sep. 30, 2003

(54) CARBONACEOUS HEATING ELEMENT AND PROCESS FOR PRODUCING THE SAME

(75) Inventors: Yoshihisa Suda, Tokyo (JP); Osamu Shimizu, Tokyo (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 09/446,307

(22) PCT Filed: Jun. 25, 1998

(86) PCT No.: PCT/JP98/02849

§ 371 (c)(1),
(2), (4) Date: Dec. 20, 1999

(87) PCT Pub. No.: WO98/59526

PCT Pub. Date: Dec. 30, 1998

(30) Foreign Application Priority Data

Jun. 25, 1997 (JP) ............................................ 9-169047
Sep. 24, 1997 (JP) ............................................ 9-258893

(51) Int. Cl.$^{7}$ ................................................ C01B 31/00

(52) U.S. Cl. ....................... 264/670; 264/669; 264/681; 264/682; 264/683; 264/652; 264/614; 264/29.1; 264/340

(58) Field of Search .......................... 428/408; 219/552, 219/553; 373/117; 264/29.1, 614, 652, 669, 670, 681–683, 340; 318/15

(56) References Cited

U.S. PATENT DOCUMENTS 6,008,451 A * 12/1999 Ichinose et al.
6,049,065 A * 4/2000 Konishi

FOREIGN PATENT DOCUMENTS

| | | |
|---|---|---|
| JP | 43-26234 | 11/1943 |
| JP | 56-46237 | 10/1981 |
| JP | 58-15913 | 3/1983 |
| JP | 3-67316 | 10/1991 |
| JP | 8-26827 | 1/1996 |

* cited by examiner

*Primary Examiner*—Deborah Jones
*Assistant Examiner*—Wendy Boss
(74) *Attorney, Agent, or Firm*—Foley & Lardner

(57) ABSTRACT

The present invention provides a carbon heating element having an arbitrary specific resistance and an arbitrary shape which are arbitrary necessary as a heating element, and a method of producing the same. The carbon heating element is obtained by uniformly dispersing one or at least two metal or metalloid compounds into a composition having shapability and showing a high yield of a carbon residue after firing, shaping the dispersed material-containing mixture thus obtained, and firing the shaped material under a non-oxidizing atmosphere.

6 Claims, No Drawings

CARBONACEOUS HEATING ELEMENT AND PROCESS FOR PRODUCING THE SAME

TECHNICAL FIELD

The present invention relates to a carbon heating element having an arbitrary specific resistance and an arbitrary shape which are necessary, arbitrary as a heating element, and a method of producing the same.

BACKGROUND ART

Worked materials of metal wire such as tungsten wire and Nichrome wire, machined materials of carbon such as isotropic carbon material and glassy carbon, and metal compounds such as silicon carbide have heretofore been used, principally, as heating element resistances. Of these substances, the worked material of metal wire has been mainly used as a heating element for heaters in a small sized commercial apparatus, and the carbon and metal compounds have been used for industrial furnaces, etc.

Of conventional materials for heating elements, carbon differs from metal wire, etc. in that it is excellent in properties such as a heating rate, heating efficiency and the efficiency of generating far infrared rays. However, because conventional carbon heating elements are produced from large plate-like or block-like bodies by machining, the production process is complicated and costly, and production of thin rods and sheets is difficult. Moreover, the heating elements have a problem in that there are no measures other than to vary the shape of the elements to control the calorific values of the elements because the heating elements are prepared by cutting blocks, etc., having specific resistances in a certain specified ranges.

The present invention has been achieved in view of such problems. An object of the present invention is to provide a carbon heating element the heating of which can be controlled by applying a predetermined current and a predetermined potential in broad ranges because the heating element can be made not only in a sheet-like form but also in a thin rod-like form and a thin cylindrical form that cannot be obtained when the heating element is made of a conventional carbon material and because the heating element can be made to have an arbitrary specific resistance, an excellent heating rate, an excellent heating efficiency and excellent efficiency in generating far infrared rays, and a method of producing the same.

DISCLOSURE OF THE INVENTION

In view of the situation described above, the present inventors have intensively carried out research on the development of a heating element having an arbitrary specific resistance and an arbitrary shape which are necessary to a heating element. Consequently, the present inventors have confirmed the fact that a carbon heating element obtained by mixing, for the purpose of making the heating element have a desired resistance after firing and carbonizing, one or at least two metal or metalloid compounds such as metal carbides, borides, silicides, metal nitrides, metal oxides, metalloid nitrides, metalloid oxides and metalloid carbides with a composition having shapability and showing a substantially nonzero yield of a carbon residue after firing, and firing the resultant mixture can effectively solve the above problems. That is, the carbon heating element has a specific resistance and a shape which are arbitrary, and the heating of the heating element can be controlled by a predetermined current and a predetermined potential; moreover, the heating element is excellent in heating rate, heating efficiency and the efficiency of generating far infrared rays.

The present invention provides a method of producing a carbon heating element, which comprises the steps of mixing a composition having shapability and showing a substantially nonzero yield of a carbon residue after firing with one or at least two metal or metalloid compounds, and firing the mixture.

The present invention also provides a carbon heating element produced by the method mentioned above.

Examples of the metal or metalloid compounds mentioned above include metal carbides, borides, silicides, metal nitrides, metal oxides, metalloid nitrides, metalloid oxides and metalloid carbides. The types and amounts of metal compounds and metalloid compounds to be used are suitably selected in accordance with the resistance and shape of a desired heating element. Although a single compound or a mixture of at least two of the compounds can be used, use of boron carbide, silicon carbide, boron nitride and aluminum oxide is particularly preferred in view of easy control of the resistance. In order to maintain the excellent properties carbon has, the amount to be used is preferably up to 70 parts by weight.

Organic substances showing a yield of carbonization of at least 5% when fired under an inert gas atmosphere are used as a composition mentioned above. Concrete examples of the organic substances include thermoplastic resins such as polyvinyl chloride, polyacrylonitrile, polyvinyl alcohol, vinyl chloride-vinyl acetate copolymer and polyamide, thermosetting resins such as phenolic resin, furan resin, epoxy resin, unsaturated polyester resin and polyimide, natural polymers having condensed polycyclic aromatic groups in a basic structure thereof, such as lignin, cellulose, tragacanth gum, gum arabi and saccharide, formalin condensation products of naphthalenesulfonic acid which are not included in the substances mentioned above, and synthetic polymers having condensed polycyclic aromatic groups in a basic structure thereof, such as copna resin. The type and amount of a composition to be used are suitably selected in accordance with the shape of a desired heating element. The organic substances can be used singly or in a mixture of at least two of them. Use of a polyvinyl chloride and furan resin is particularly preferred. In order to maintain the excellent properties carbon has, the amount of the resins to be used is preferably at least 30 parts by weight.

The composition preferably contains carbon powder. Examples of the carbon powder-include carbon black, graphite and coke powder. The types and amounts of carbon powders to be used are suitably selected in accordance with the resistance and shape of a desired heating element. The carbon powders can be used singly or in a mixture of at least two of them. However, use of graphite is particularly preferred because of the easy control of the shape.

In the present invention, the carbon material produced by firing the organic substances as mentioned above and the carbon powder act as good conductors, and the metal or metalloid compounds act as conductivity-inhibiting materials. The current jumps over, namely, hops over the metal or metalloid compounds which are conductivity-inhibiting material, and flows through the carbon material, or the carbon material and carbon powder as a medium. The carbon heating element of the present invention having a desired specific resistance can therefore be obtained by varying the types and proportion of these two or three components, mixing and dispersing these components, and firing the mixture.

Furthermore, because the carbon heating element of the present invention is excellent in properties as a heating element such as a heating rate, heating efficiency and the efficiency of generating far infrared rays, and because it can be made to have a resistance and a shape which have been designed in advance, it is possible to control the calorific value easily by applying a current and a potential which have been predetermined.

However, when the calorific value is to be controlled, the heating element may sometimes have a considerably high temperature. Oxidation of the heating element must therefore be prevented by using it in a container having an atmosphere of an inert gas such as an Ar gas. Moreover, it is desirable to use a transparent container such as a quartz container not impairing the efficiency of generating far infrared rays and capable of withstanding the high temperature.

BEST MODE FOR CARRYING OUT THE INVENTION

The method of producing the carbon heating element according to the present invention will be explained below. First, a composition is mixed well with metal or metalloid compounds using a kneader. The mixture thus obtained is shaped into a designed form by a conventional procedure such as a vacuum forming machine, an injection molding machine or an extruder. The shaped material is subsequently treated to give a precursor of carbon. The precursor thus obtained is heated to about 1,000° C., preferably about 2,000° C., under an atmosphere of an inert gas such as argon or in vacuum to be carbonized, thereby producing a carbon heating element. It is suitable that the precursor be slowly fired particularly in the temperature range of up to 500° C. at a rate of 3 to 100° C./h, preferably 5 to 50° C./h. When the heating rate is large, the fired material is deformed or defects such as fine cracks are formed therein. Accordingly, a heating rate of at least 100° C./h should be avoided in the temperature range of up to 500° C.

The carbon heating element of the present invention is excellent, as a heating element, in properties such as a heating rate, heating efficiency and the efficiency of generating far infrared rays, and can be made to have a resistance and a shape which have been designed in advance. It is therefore possible to control the calorific value easily by applying a predetermined current and a predetermined potential.

The present invention will be explained below more concretely by making reference to examples. However, the present invention is in no way restricted to the examples.

EXAMPLE 1

Twenty percent by weight of diallyl phthalate monomer as a plasticizer was added to a mixture comprising (a) a composite composition comprising (i) mixed resins comprising 45% by weight of a chlorinated polyvinyl chloride (trade name of T-741, manufactured by Nippon Carbide Industries Co., Ltd.) and 15% by weight of a furan resin (trade name of Hitafuran VF 302, manufactured by Hitachi Chemical Co., Ltd.) and (ii) 10% by weight of natural graphite fine powder (having an average particle size of 5 μm, manufactured by Nippon Graphite Industry Co., Ltd.) and (b) 30% by weight of boron nitride (having an average particle size of 2 μm, manufactured by Shinetsu Chemical Co., Ltd.). The monomer was dispersed by a Henschel mixer, and the resultant mixture was repeatedly kneaded well using a twin roll for mixing with its surface temperature held at 120° C. to give a composition. The composition was pelletized with a pelletizer to give a composition for molding. The resultant pellets were extruded at 130° C. at a rate of 3 m/sec using a screw extruder having a die 1.5 mm in diameter while degassing was conducted. The extruded material was fixed to a frame, and treated in an air oven heated at 180° C., for 10 hours to give precursor (precursor of carbon) wire. The wire was heated in a nitrogen gas to 500° C. at a rate of 25° C./h, then to 1,800° C. at a rate of 100° C./h, held at 1,800° C. for 3 hours, and allowed to stand to cool, thereby finishing firing.

The carbon heating element thus obtained had a diameter of 1.0 mm, and showed a flexural strength of 340 MPa. The carbon heating element showed a specific resistance of $5.5\times10^{-3}$ Ω·cm when measured by the Wheatstone bridge method. The carbon heating element was cut to have a length of 165 mm. Both ends of the heating element were connected to respective leads, and a current was applied to the heating element under an Ar atmosphere. The heating element then instantaneously reached 1,200° C. at 100 V, and far infrared irradiation could be confirmed. Moreover, no cracks were formed during use, and a stabilized calorific value could be obtained.

EXAMPLE 2

Twenty percent by weight of diallyl phthalate monomer as a plasticizer was added to a mixture comprising (a) a composite composition comprising (i) mixed resins comprising 40% by weight of a furan resin (trade name of Hitafuran VF 303, manufactured by Hitachi Chemical Co., Ltd.) and 15% by weight of dry-distilled pitch (trade name of MH-1P, manufactured by Kureha Chemical Industry Co., Ltd.) and (ii) 15% by weight of kish-graphite powder. (having an average particle size of. 4 μm, manufactured-by Kowa Seiko Sha K.K.), (b) 5% by weight of silicon carbide powder (having an average particle size of 1 μm, manufactured by Idemitsu Petrochemical Co., Ltd.) and (c) 25% by weight of boron nitride (having an average particle size of 5 μm, manufactured by Shinetsu Chemical Co., Ltd.). The monomer was dispersed by.a Henschel mixer, and the resultant mixture was repeatedly kneaded well using a three-roll mill for mixing with its surface temperature held at 100° C. to give a sheet-like composition, which was pelletized with a pelletizer. The resultant pellets were extruded at a discharge rate of 1 m/sec using a plunger hydraulic extruder having a rectangular die 0.8 mm in height and 2.0 mm in width while degassing was carried out. The extruded material was fixed to a frame, and treated in an air oven heated at 200° C., for 10 hours to give precursor (precursor of carbon) wire. The wire was heated in a nitrogen gas to 500° C. at a rate of 25° C./h, then to 1,400° C. at a rate of 100° C./h, held at 1,400° C. for 3 hours, and allowed to stand to cool, thereby finishing firing.

The carbon heating element thus obtained was 0.5 mm in thickness and 1.5 mm in width and showed a flexural strength of 300 MPa. The carbon heating element showed a specific resistance of $4.5\times10^{-3}$ Ω·cm when measured by the.Wheatstone bridge method. The carbon heating element was cut to have a length of 180 mm. Both ends of the heating element were connected to respective leads, and a current was applied to the heating element under an Ar atmosphere the heating element then instantaneously reached 1,200° C. at 100 V, and far infrared irradiation could be confirmed. Moreover, no cracks were formed during use, and a stabilized calorific value could be obtained.

EXAMPLE 3

Twenty parts by weight of diallyl phthalate monomer as a plasticizer was added to a mixture comprising (a) a composition prepared by allowing mixed resins comprising 45 parts by weight of a chlorinated polyvinyl chloride (trade name of T-741, manufactured by Nippon Carbide Industries Co., Ltd.) and 15 parts by weight of a furan resin (trade name of Hitafuran VF 302, manufactured by Hitachi Chemical Co., Ltd.) to contain 10 parts by weight of natural graphite fine powder (having an average particle size of 5 $\mu$m, manufactured by Nippon Graphite Industry Co., Ltd.) and (b) 30 parts by weight of boron nitride (having an average particle size of 2 $\mu$m, manufactured by Shinetsu Chemical Co., Ltd.). The monomer was dispersed and mixed, and the resultant mixture was extruded. The extruded material was fired under a nitrogen gas atmosphere to give a columnar carbon heating element.

The carbon heating element thus obtained had a cross-sectional diameter of 0.8 mm, and showed a flexural strength of 340 MPa. The carbon heating element showed a specific resistance of $5.5\times10^{-3}$ Ω·cm when measured by the Wheatstone bridge method. The carbon heating element was cut to have a length of 165 mm. Both ends of the heating element were connected to respective leads, and a current was applied to the heating element in a quartz tube having an Ar gas atmosphere. The heating element then instantaneously reached 1,200° C. at 100 V, and far infrared irradiation could be confirmed. Moreover, no cracks were formed during use, and a stabilized calorific value could be obtained.

EXAMPLE 4

Twenty parts by weight of diallyl phthalate monomer as a plasticizer was added to a mixture comprising (a) a composition prepared by allowing mixed resins comprising 30 parts by weight of a chlorinated polyvinyl chloride (trade name of T-741, manufactured by Nippon Carbide Industries Co., Ltd.) and 10 parts by weight of a furan resin (trade name of Hitafuran VF 302, manufactured by Hitachi Chemical Co., Ltd.) to contain 10 parts by weight of natural graphite fine powder (having an average particle size of 5 $\mu$m, manufactured by Nippon Graphite Industry Co., Ltd.) and (b) 50 parts by weight of boron nitride (having an average particle size of 2 $\mu$m, manufactured by Shinetsu Chemical Co., Ltd.). The monomer was dispersed, and a columnar carbon heating element was obtained by the same procedure as in Example 3.

The carbon heating element thus obtained had a cross-sectional diameter of 0.8 mm, and showed a flexural strength of 315 MPa. The carbon heating element showed a specific resistance of $7.5\times10^{-3}$ Ω·cm when measured by the Wheatstone bridge method. The carbon heating element was cut to have a length of 165 mm. Both ends of the heating element were connected to respective leads, and a current was applied to the heating element in a quartz tube having an Ar gas atmosphere. The heating element then instantaneously reached 1,250° C. at 100 V, and far infrared irradiation could be confirmed. Moreover, no cracks were formed during use, and a stabilized calorific value could be obtained.

EXAMPLE 5

Twenty parts by weight of diallyl phthalate monomer as a plasticizer was added to a mixture comprising (a) a composition prepared by allowing mixed resins comprising 30 parts by weight of a chlorinated polyvinyl chloride (trade name of T-741, manufactured by Nippon Carbide Industries Co., Ltd.) and 5 parts by weight of a furan resin (trade name of Hitafuran VF 302, manufactured by Hitachi Chemical Co., Ltd.) to contain 5 parts by weight of natural graphite fine powder (having an average particle size of 5 $\mu$m, manufactured by Nippon Graphite Industry Co., Ltd.) and (b) 60 parts by weight of boron nitride (having an average particle size of 2 $\mu$m, manufactured by Shinetsu Chemical Co., Ltd.). The monomer was dispersed, and a columnar carbon heating element was obtained by the same procedure as in Example 3.

The carbon heating element thus obtained had a cross-sectional diameter of 0.7 mm, and showed a flexural strength of 300 MPa. The carbon heating element showed a specific resistance of $9.8\times10^{-3}$ Ω·cm when measured by the Wheatstone bridge method. The carbon heating element was cut to have a length of 165 mm. Both ends of the heating element were connected to respective leads, and a current was applied to the heating element in a quartz tube having an Ar gas atmosphere. The heating element then instantaneously reached 1,350° C. at 100 V, and far infrared irradiation could be confirmed. Moreover, no cracks were formed during use, and a stabilized calorific value could be obtained.

EXAMPLE 6

Twenty parts by weight of diallyl phthalate monomer as a plasticizer was added to a mixture comprising (a) mixed resins comprising 25 parts by weight of a chlorinated polyvinyl chloride (trade name of T-741, manufactured by Nippon Carbide Industries Co., Ltd.) and 5 parts by weight of a furan resin (trade name of Hitafuran VF 302, manufactured by Hitachi Chemical Co., Ltd.) and (b) 70 parts by weight of boron nitride (having an average particle size of 2 $\mu$m, manufactured by Shinetsu Chemical Co., Ltd.). The monomer was dispersed, and a columnar carbon heating element was obtained by the same procedure as in Example 3.

The carbon heating element thus obtained had a cross-sectional diameter of 2.0 mm, and showed a flexural strength of 250 MPa. The carbon heating element showed a specific resistance of $19.8\times10^{-3}$ Ω·cm when measured by the Wheatstone bridge method. The carbon heating element was cut to have a length of 165 mm. Both ends of the heating element were connected to respective leads, and a current was applied to the heating element in a quartz tube having an Ar gas atmosphere. The heating element then instantaneously reached 1,350° C. at 100 V, and far infrared irradiation could be confirmed. Moreover, no cracks were formed during use, and a stabilized calorific value could be obtained.

EXAMPLE 7

Twenty parts by weight of diallyl phthalate monomer as a plasticizer was added to a mixture comprising 50 parts by weight of a chlorinated polyvinyl chloride (trade name of T-741, manufactured by Nippon Carbide Industries Co., Ltd.), 45 parts by weight of natural graphite fine powder (having an average particle size of 5 $\mu$m, manufactured by Nippon Graphite Industry Co., Ltd.) and 5 parts by weight of boron nitride (having an average particle size of 2 $\mu$m, manufactured by Shinetsu Chemical Co., Ltd.). The monomer was dispersed, and a columnar carbon heating element was obtained by the same procedure as in Example 3.

The carbon heating element thus obtained had a diameter of 0.1 mm, and showed a flexural strength of 500 MPa. The carbon heating element showed a specific resistance of $0.3\times10^{-3}$ Ω·cm when measured by the Wheatstone bridge method. The carbon heating element was cut to have a length of 165 mm. Both ends of the heating element were connected to respective leads, and a current was applied to the heating element in a quartz tube having an Ar gas atmosphere. The heating element then instantaneously reached 1,000° C. at 100 V, and far infrared irradiation could be confirmed. Moreover, no cracks were formed during use, and a stabilized calorific value could be obtained.

EXAMPLE 8

Twenty parts by weight of diallyl phthalate monomer as a plasticizer was added to a mixture comprising mixed resins comprising 40 parts by weight of a furan resin (trade name of Hitafuran VF 303, manufactured by Hitachi Chemical Co., Ltd.) and 15 parts by weight of dry-distilled pitch (trade name of MH-1P, manufactured by Kureha Chemical Industry Co., Ltd.), 15 parts by weight of kish graphite powder (having an average particle size of 4 $\mu$m, manufactured by Kowa Seiko Sha K.K.), 5 parts by weight of silicon carbide powder (having an average particle size of 1 $\mu$m, manufactured by Idemitsu Petrochemical Co., Ltd.) and 25 parts by weight of boron nitride (having an average particle size of 5 $\mu$m, manufactured by Shinetsu Chemical Co., Ltd.). The monomer was dispersed, and a columnar carbon heating element was obtained by the same procedure as in Example 1.

The carbon heating element thus obtained had a cross-sectional diameter of 1.5 mm, and showed a flexural strength of 320 MPa. The carbon heating element showed a specific resistance of $11.3\times10^{<3}$ Ω·cm when measured by the Wheatstone bridge method. The carbon heating element was cut to have a length of 180 mm. Both ends of the heating element were connected to respective leads, and a current was applied to the heating element in a quartz tube having an Ar gas atmosphere. The heating element then instantaneously reached 1,200° C. at 100 V, and far infrared irradiation could be confirmed. Moreover, no cracks were formed during use, and a stabilized calorific value could be obtained.

EXAMPLE 9

Twenty parts by weight of diallyl phthalate monomer as a plasticizer was added to a mixture comprising mixed resins comprising 35 parts by weight of a furan resin (trade name of Hitafuran VF 303, manufactured by Hitachi Chemical Co., Ltd.) and 10 parts by weight of dry-distilled pitch (trade name of MH-1P, manufactured by Kureha Chemical Industry Co., Ltd.), 10 parts by weight of kish graphite powder (having an average particle size of 4 $\mu$m, manufactured by Kowa Seiko Sha K.K.), 5 parts by weight of silicon carbide powder (having an average particle size of 1 $\mu$m, manufactured by Idemitsu Petrochemical Co., Ltd.) and 40 parts by weight of boron nitride (having an average particle size of 5 $\mu$m, manufactured by Shinetsu Chemical Co., Ltd.). The monomer was dispersed, and a columnar carbon heating element was obtained by the same procedure as in Example 3.

The carbon heating element thus obtained had a cross-sectional diameter of 0.5 mm, and showed a flexural strength of 405 MPa. The carbon heating element showed a specific resistance of $3.5\times10^{-3}$ Ω·cm when measured by the Wheatstone bridge method. The carbon heating element was cut to have a length of 180 mm. Both ends of the heating element were connected to respective leads, and a current was applied to the heating element in a quartz tube having an Ar gas atmosphere. The heating element then instantaneously reached 1,300° C. at 100 V, and far infrared irradiation could be confirmed. Moreover, no cracks were formed during use, and a stabilized calorific value could be obtained.

As explained above, the carbon heating element of the present invention can have an arbitrary fine shape and an arbitrary resistance compared with conventional carbon materials in addition to that the heating element is, like other carbon heating elements, excellent-in properties such as a heating rate, heating efficiency and the efficiency of generating far infrared rays, compared with metal heating elements. Accordingly, a predetermined current and predetermined potential, which may range widely, can be applied to the heating element, and the heating element shows excellent reproducibility and high reliability, exhibiting that the heating element is extremely excellent.

EXAMPLE 10

Twenty-four parts by weight of diallyl phthalate monomer as a plasticizer was added to a mixture comprising (a) a composition prepared by allowing 30 parts by weight of a chlorinated polyvinyl chloride (trade name of T-741, manufactured by Nippon Carbide Industries Co., Ltd.) to contain 2 parts by weight of natural graphite powder (having an average particle size of 5 $\mu$m, manufactured by Nippon Graphite Industry Co., Ltd.), (b) 60 parts by weight of boron nitride (having an average particle size of 2 $\mu$m, manufactured by Shinetsu Chemical Co., Ltd.) and (c) 8 parts by weight of aluminum oxide (alumina) powder (having an average particle size of 7 $\mu$m). The monomer was dispersed by a Henschel mixer, and the resultant mixture was repeatedly kneaded well using a three-roll mill for mixing with its surface temperature held at 100° C., and palletized with a pelletizer. The resultant pellets were extruded using a screw extruder having a die 3 mm in diameter while degassing was carried out. The extruded material was fixed to a frame, and treated in an air oven heated at 180° C., for 10 hours to give precursor (precursor of carbon) wire. The wire was heated to 500° C. in a nitrogen gas at a rate of 25° C./h, then to 1,000° C. at a rate of 50° C./h, and held at 1,000° C. for 3 hours.

The heated wire was subsequently heated to 1,100° C. in vacuum at a rate of 100° C./h, held at 1,100° C. for 3 hours while the vacuum state was being maintained, and allowed to stand to cool, thereby finishing firing.

The carbon heating element thus obtained had a columnar shape 2.3 mm in diameter, and showed a flexural strength of 200 MPa. The carbon heating element showed a specific resistance of $125\times10^{-3}$ Ω·cm when measured by the Wheatstone bridge method. The carbon heating element was cut to have a length of 290 mm. Both ends of the heating element were connected to respective leads, and a current was applied to the heating element under an Ar gas atmosphere. The heating element then instantaneously reached 900° C. (not higher than the treating temperature) at 100 V, and far infrared irradiation could be confirmed. Moreover, no cracks were formed during use, and a stabilized calorific value could be obtained.

What is claimed is:

1. A method of producing a carbon heating element, comprising the steps of mixing a composition having shapability and showing a substantially nonzero yield of a carbon residue after firing with one or at least two metal or metalloid compounds in a proportion corresponding to a desired specific resistance of the carbon heating element, firing the mixture, and controlling the specific resistance by varying the mixing ratio of the compounds to the composition.

2. The method of producing a carbon heating element according to claim 1, wherein the metal or metalloid compounds are metal carbides, metal borides, metal silicides, metal nitrides, metal oxides, metalloid nitrides, metalloid oxides or metalloid carbides.

3. The method of producing a carbon heating element according to claim 1, wherein the composition comprises resin.

4. The method of producing a carbon heating element according to claim 1, wherein the composition comprises one or at least two carbon powders selected from the group consisting of carbon black, graphite and coke powder.

5. The method of producing a carbon heating element according to claim 1, wherein the composition comprises one or at least two carbon powders selected from the group consisting of graphite and coke powder.

6. The method of producing a carbon heating element according to claim 1, further comprising the step of putting the fired mixture into a heat-resistant vessel which is closed and has therewithin an atmosphere made inactive with an inert gas.

* * * * *